US012803178B2

(12) United States Patent
Singh et al.

(10) Patent No.: US 12,803,178 B2

(45) **Date of Patent: *Nov. 17, 2026**

(54) COMPACT TRANSCEIVER WITH ADVANCED BEAM-SCANNING FUNCTIONALITY BASED ON LEAKY WAVE ANTENNA

(71) Applicant: Dell Products L.P., Round Rock, TX (US)

(72) Inventors: Tejinder Singh, Manotick (CA); Kan Wang, Ottawa (CA); Navjot Kaur Khaira, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/780,280

(22) Filed: Jul. 22, 2024

(65) Prior Publication Data

US 2026/0024921 A1 Jan. 22, 2026

(51) Int. Cl.

*H01Q 19/10* (2006.01)

*H01Q 1/22* (2006.01)

(Continued)

(52) U.S. Cl.

CPC ........... *H01Q 19/10* (2013.01); *H01Q 1/2258* (2013.01); *H01Q 1/273* (2013.01); *H01Q 13/28* (2013.01)

(58) Field of Classification Search

CPC ...... H01Q 19/10; H01Q 1/2258; H01Q 1/273; H01Q 13/28; H01Q 3/24

See application file for complete search history.

(56) References Cited

U.S. PATENT DOCUMENTS 2,648,839 A * 8/1953 Ford .......................... G01S 1/02 342/158

2,894,261 A * 7/1959 Yaru ...................... H01Q 1/281 343/756

(Continued)

FOREIGN PATENT DOCUMENTS

| | | |
|---|---|---|
| CN | 114168014 A | 3/2022 |
| CN | 117044035 A | 11/2023 |
| EP | 2 495 621 A1 | 9/2012 |

OTHER PUBLICATIONS

Singh, et al. "Passive Wearable Device for Security and Authentication" U.S. Appl. No. 18/775,968, filed Jul. 17, 2024, 39 pages.

(Continued)

*Primary Examiner* — Dameon E Levi

*Assistant Examiner* — Jordan E. DeWitt

(74) *Attorney, Agent, or Firm* — Amin, Turocy & Watson, LLP

(57) ABSTRACT

The technology described herein is directed towards a transceiver with beam scanning capability based on leaky wave antenna technology, which facilitates a compact transceiver design. The leaky wave antenna can be incorporated into a substrate integrated waveguide design, and can include different respective groups of slot pairs having different respective periodicities, corresponding to different respective beam steering directions. The transceiver can thus steer signals to a wearable or portable device that includes a passive metasurface while mitigating null regions; the transceiver transmits a wireless radio frequency signal towards the metasurface integrated into the wearable device, whereby the metasurface reflects an (e.g., metasurface-altered) instance of the incoming signal back to the transceiver. The receipt of the reflected signal can, for example, facilitate proximity detection of the user. The slot pairs can (Continued)

be asymmetrical reflection-canceling slot pairs, to achieve broadside radiation while avoiding band-stop effects.

20 Claims, 12 Drawing Sheets

(51) Int. Cl.
*H01Q 1/27* (2006.01)
*H01Q 13/28* (2006.01)

(56) References Cited

U.S. PATENT DOCUMENTS 2,981,949 A * 4/1961 Elliott .................... H01Q 13/20 343/762
3,218,644 A * 11/1965 Berry ..................... H01Q 11/10 333/206
3,308,467 A * 3/1967 Morrison, Jr. ..... H01Q 21/0043 343/705
4,518,967 A * 5/1985 Westerman ............ H01Q 13/20 343/770
5,579,019 A * 11/1996 Uematsu .............. H01Q 21/005 343/770
10,038,690 B2 7/2018 Andrews et al.
10,193,880 B1 1/2019 Jiang et al.
10,497,227 B2 12/2019 Bilal et al.
10,701,067 B1 6/2020 Ziraknejad et al.
11,042,613 B2 6/2021 Deole et al.
11,074,488 B2 7/2021 Klimt
11,340,392 B1 5/2022 Wollack et al.
11,393,037 B1 7/2022 Fields et al.
11,461,687 B1 10/2022 Shaikh et al.
11,757,165 B2 * 9/2023 Shi .......................... H01P 3/123 343/700 R
11,949,673 B1 4/2024 Sanchez
12,225,026 B1 2/2025 Zhou et al.
12,260,077 B1 3/2025 V et al.
12,407,681 B2 9/2025 Young et al.
12,615,491 B2 4/2026 Carrigan et al.
2001/0017603 A1 * 8/2001 Teshirogi ............... H01Q 13/28 343/785
2003/0098815 A1 * 5/2003 Teshirogi ............... H01Q 25/00 343/772
2005/0038994 A1 2/2005 Johnson et al.
2006/0097942 A1 * 5/2006 Tanaka ............... H01Q 15/0006 343/756
2007/0091004 A1 4/2007 Puuri
2011/0209372 A1 9/2011 Padgett et al.
2012/0056776 A1 * 3/2012 Shijo .................... H01Q 21/064 342/146
2012/0306711 A1 * 12/2012 Asplund .............. H01Q 13/203 343/776
2015/0035643 A1 2/2015 Kursun
2015/0109106 A1 4/2015 Gomez et al.
2015/0147065 A1 5/2015 Civelli et al.
2015/0222023 A1 * 8/2015 Shijo ................... G01S 13/4463 342/195
2016/0028715 A1 1/2016 Sivashanmugam et al.
2016/0254396 A1 9/2016 Casse
2018/0303381 A1 10/2018 Todd et al.
2019/0132399 A1 5/2019 Henning et al.
2019/0223334 A1 7/2019 Jacobsson
2019/0379120 A1 * 12/2019 Manasson .......... H01Q 21/0006
2020/0005113 A1 1/2020 Schnippering
2020/0012912 A1 1/2020 Klimt
2020/0042977 A1 2/2020 Boulby
2020/0294642 A1 9/2020 Bostic et al.
2020/0403647 A1 12/2020 Bit-Babik et al.
2021/0028528 A1 * 1/2021 Alexanian ............ H01Q 1/3233
2021/0258314 A1 8/2021 Tabaja
2022/0012336 A1 1/2022 Lakkundi et al.
2022/0078762 A1 3/2022 Machado et al.
2022/0085841 A1 3/2022 Grétarsson et al.
2022/0413587 A1 12/2022 Lagnado et al.
2023/0155812 A1 5/2023 Bennison
2023/0344136 A1 * 10/2023 Liu .................... H01B 11/1808
2023/0386245 A1 11/2023 Tada
2024/0194344 A1 6/2024 Capodilupo et al.
2024/0214967 A1 6/2024 Zorgui et al.
2024/0248366 A1 7/2024 Cho et al.
2024/0250445 A1 * 7/2024 Sano ...................... H01Q 13/26
2024/0310561 A1 9/2024 Allen et al.
2024/0387998 A1 * 11/2024 Wong ................... H01Q 9/0485
2024/0393433 A1 11/2024 Elian et al.
2024/0402342 A1 12/2024 Knapp et al.
2024/0406752 A1 12/2024 Coskun et al.
2025/0078593 A1 3/2025 Beuchat et al.
2025/0309943 A1 10/2025 Elshafie et al.
2025/0372886 A1 * 12/2025 Wada ................. H01Q 21/0031
2026/0024921 A1 * 1/2026 Singh ........................ H01Q 3/24
2026/0025172 A1 * 1/2026 Singh ..................... H04B 7/043

OTHER PUBLICATIONS

Singh, et al. "Scalable and Compact Metasurface Design for Smart and Functional Wearable Devices" U.S. Appl. No. 18/775,979, filed Jul. 17, 2024, 39 pages.
Singh, et al. "Integrated Physical Device Identification for Remote Management of Wearable Metasurfaces" U.S. Appl. No. 18/775,984, filed Jul. 17, 2024, 41 pages.
Singh, et al. "Differentiating Physical Radiation Patterns in Passive Metasurfaces" U.S. Appl. No. 18/775,993, filed Jul. 17, 2024, 40 pages.
Singh, et al. "Customization and Appearance Information for Wearable Metasurfaces" U.S. Appl. No. 18/775,999, filed Jul. 17, 2024, 41 pages.
Singh, et al. "Computer Peripheral With Embedded Transceiver for Proximity Detection of Wearable Metasurfaces" U.S. Appl. No. 18/776,001, filed Jul. 17, 2024, 40 pages.
Singh, et al. "Proximity Based Multifactor Authentication Using Passive Wearable Metasurfaces" U.S. Appl. No. 18/776,007, filed Jul. 17, 2024, 46 pages.
Singh, et al. "Automatic Computing Device Wake up and Lock Using Passive Wearable Metasurface" U.S. Appl. No. 18/776,011, filed Jul. 17, 2024, 45 pages.
Singh, et al. "Software Stack and Backend for Passive Wearable Metasurfaces for Remote Management and Analytics" U.S. Appl. No. 18/776,018, filed Jul. 17, 2024, 50 pages.
Singh, et al. "Activation and Deactivation Detection for a Passive Wearable Metasurface Using a Segmented Ground Plane" U.S. Appl. No. 18/780,245, filed Jul. 22, 2024, 42 pages.
Singh, et al. "Design and Deployment of a Wearable Metasurface With a Segmented Ground Plane" U.S. Appl. No. 18/780,263, filed Jul. 22, 2024, 39 pages.
Singh, et al. "Aperture Reconfiguration for Transceiver With Beam-Scanning Capability" U.S. Appl. No. 18/780,284, filed Jul. 22, 2024, 37 pages.
Office Action mailed Dec. 10, 2025 for U.S. Appl. No. 18/775,968, 34 pages.
Notice of Allowance mailed Oct. 21, 2025 for U.S. Appl. No. 18/776,007, 43 pages.
Notice of Allowance mailed Oct. 24, 2025 for U.S. Appl. No. 18/776,018, 40 pages.
Office Action mailed Dec. 10, 2025 for U.S. Appl. No. 18/775,984, 28 pages.
Notice of Allowance mailed Mar. 21, 2025 for U.S. Appl. No. 18/780,245, 25 pages.
"Introducing the New Oura Ring Generation 3" Oura. [https://ouraring.com/blog/oura-generation2-vs-generation3/], retrieved Jul. 3, 2025, 3 pages.
"Galaxy Ring—Galaxy AI is here" Samsung. [https://www.samsung.com/us/rings/galaxy-ring/?msockid=2bb734e76e306246380e20d36f0b63d2], retrieved Jul. 3, 2025, 19 pages.
Singh, et al. "Utilizing Passive Wearable Devices to Capture Device Interaction Data for Supplementary Authentication" U.S. Appl. No. 19/030,562, filed Jan. 17, 2025, 53 pages.

(56) References Cited

OTHER PUBLICATIONS

Singh, et al. "Long-Term Pattern Recognition Using Proximity Detection for Security Applications" U.S. Appl. No. 19/056,466, filed Feb. 18, 2025, 49 pages.
Singh, et al. "User Authentication in Computer Devices Through Statistical Analysis of Gesture Data" U.S. Appl. No. 19/170,829, filed Apr. 4, 2025, 40 pages.
Office Action mailed Jun. 3, 2026 for U.S. Appl. No. 19/056,466, 33 pages.
Non-Final Office Action received for U.S. Appl. No. 18/775,993 dated Jan. 28, 2026, 18 pages.
Non-Final Office Action received for U.S. Appl. No. 18/775,999 dated Mar. 23, 2026, 36 pages.
Notice of Allowance received for U.S. Appl. No. 18/775,984 dated Mar. 25, 2026, 6 pages.
Notice of Allowance received for U.S. Appl. No. 18/775,968 dated Apr. 7, 2026, 6 pages.
Corrected Notice of Allowability mailed May 6, 2026 for U.S. Appl. No. 18/775,968, 41 pages.
Notice of Allowance mailed Jun. 24, 2026 for U.S. Appl. No. 18/775,993, 48 pages.
Office Action mailed Jun. 29, 2026 for U.S. Appl. No. 18/776,011, 68 pages.
Notice of Allowance mailed Jun. 30, 2026 for U.S. Appl. No. 19/030,562, 43 pages.
Notice of Allowance mailed Jun. 30, 2026 for U.S. Appl. No. 19/056,466, 69 pages.
Notice of Allowance mailed Jul. 16, 2026 for U.S. Appl. No. 18/780,263, 50 pages.
Notice of Allowance mailed Jul. 7, 2026 for U.S. Appl. No. 19/170,829, 86 pages.
Cao, H., Liu, D., Jiang, H., Wang, R., Chen, Z. and Xiong, J., 2023. "LIPAuth: Hand-dependent light intensity patterns for resilient user authentication". ACM Transactions on Sensor Networks, 19(3), pp. 1-29. (Year: 2023).
Ohtsuki, T. and Kamai, H., Sep. 2016. "Biometric authentication using hand movement information from wrist-worn PPG sensors". In 2016 IEEE 27th Annual International Symposium on Personal, Indoor, and Mobile Radio Communications (PIMRC) (pp. 1-5). IEEE. (Year: 2016).
Office Action for U.S. Appl. No. 18/775,979 dated Aug. 26, 2026, 65 pages.
Final Office Action for U.S. Appl. No. 18/775,999 dated Aug. 27, 2026, 82 pages.
Notice of Allowance for U.S. Appl. No. 18/776,011 dated Sep. 29, 2026, 37 pages.

* cited by examiner

COMPACT TRANSCEIVER WITH ADVANCED BEAM-SCANNING FUNCTIONALITY BASED ON LEAKY WAVE ANTENNA

RELATED APPLICATION

The subject patent application is related to U.S. patent application Ser. No. 18/780,284, filed Jul. 22, 2024, and entitled "APERTURE RECONFIGURATION FOR TRANSCEIVER WITH BEAM-SCANNING CAPABILITY", the entirety of which patent application is hereby incorporated by reference herein.

BACKGROUND

Existing wearable devices such as rings and wristwatches for activity tracking and/or health monitoring operate by establishing a communication link between the wearable device and a transceiver, generally using BLUETOOTH low energy technology. As such, these devices need electrical components such as a battery, various sensors, circuits, a controller, and antennas within the device, increasing the cost, size, and complexity in design. Moreover, due to the smaller battery size, these wearable devices need to be charged frequently.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
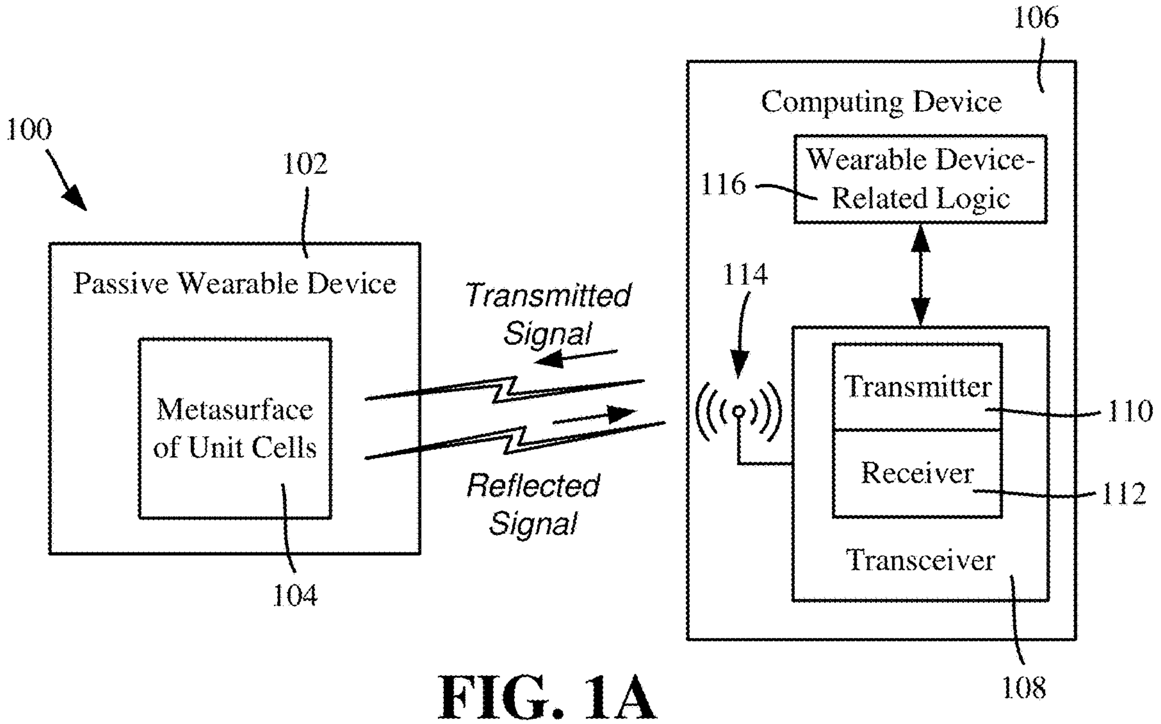
FIG. 1A is a block diagram representation of an example wearable device including a passive metasurface communicating with a computing device via an embedded transceiver, in accordance with various example embodiments and implementations of the subject disclosure.

The technology described herein is directed towards a leaky wave antenna-based transceiver that provides beam scanning capability. The leaky wave antenna can be incorporated into substrate integrated waveguide technology, which facilitates a compact transceiver design. For example, the compact transceiver design can be incorporated into a computing device or computer peripheral device, with the beam scanning signals transmitted in one or more appropriate directions to facilitate reception of the signals from a given type of device in which the transceiver is housed.

In one implementation, the leaky wave antenna has different respective groups of slot pairs, with the respective groups having different respective periodicities, resulting in different respective beam steering directions. The transceiver can thus steer signals to a wearable or portable device that includes a passive metasurface while mitigating null regions. The slot pairs can be asymmetrical reflection-canceling slot pairs, to achieve broadside radiation while avoiding band-stop effects.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104, communicates with a computing device 106. In the example of FIG. 1A, the computing device 106 includes an embedded, integrated or otherwise internal transceiver 108, which in turn includes a transmitter 110 and receiver 112. The transceiver components are coupled to an antenna 114 that transmits signals to the metasurface 104 of the passive wearable device 102, which as described herein, alters a reflected instance of the signal's characteristics to the transceiver's receiver 112. As described herein, the antenna is a leaky wave antenna configured to radiate the transmitted signals in different directions/angles. Based on the received signal, wearable device-related logic 116 (e.g., a hardware or software program running in the computing device 106) can analyze the reflected signal and take some action based thereon as described herein, such as to wake the operating system program or the like for execution in the computing device.

Figure 1B:
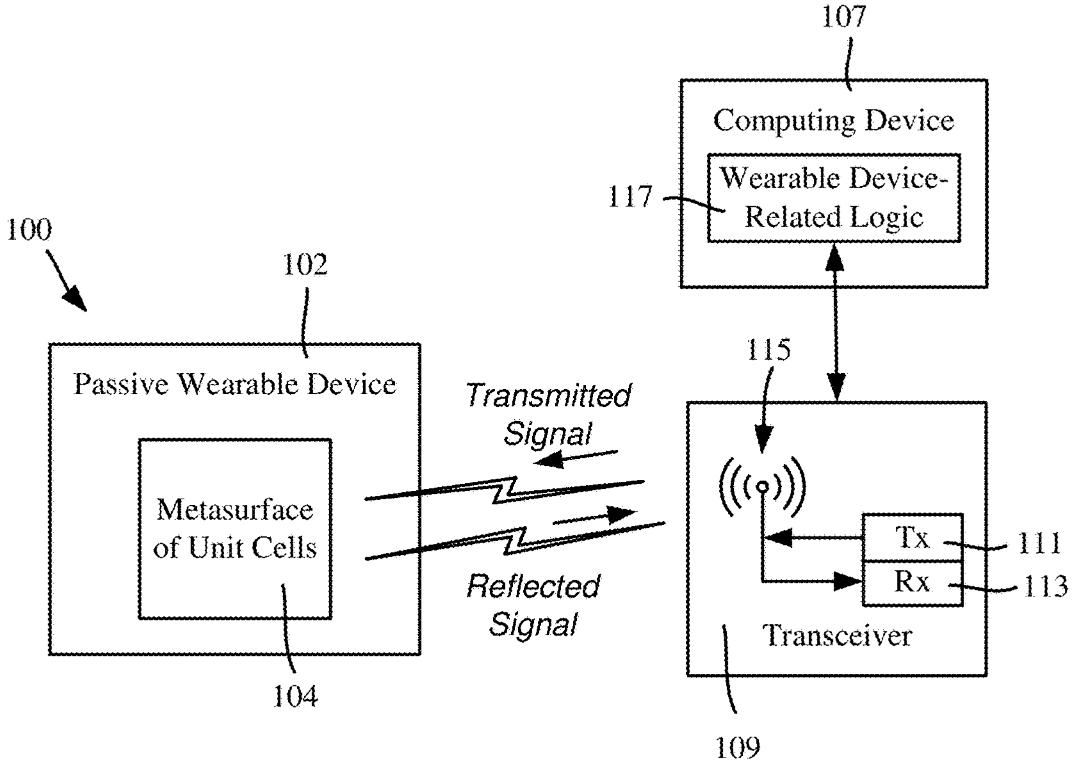
FIG. 1B is a block diagram representation of an example wearable device including a passive metasurface communicating with a computing device via an external transceiver, in accordance with various example embodiments and implementations of the subject disclosure.

FIG. 1B is similar to FIG. 1A, except that a transceiver 109 (transmitter Tx 111/receiver Rx 113) is external to the computing device 107. For example, the external transceiver 109 can be designed as a universal serial bus (USB) device or other suitable device that plugs into a port of the computing device 109. The antenna 115 is similarly a leaky wave antenna configured to radiate the transmitted signals in different directions/angles.

Figure 2A:
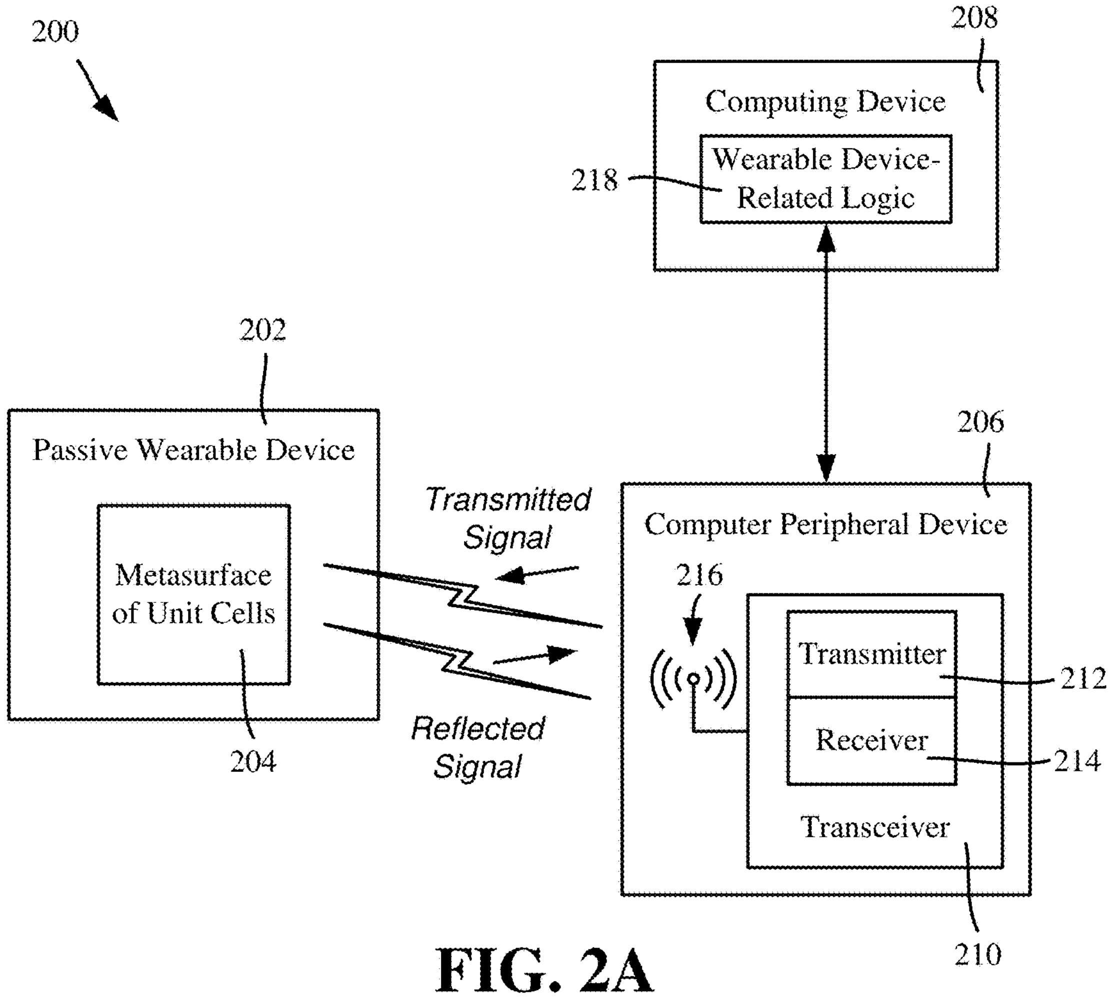
FIG. 2A is a block diagram representation of an example wearable device including a passive metasurface communicating with a computing device via a transceiver embedded in a computer peripheral device, in accordance with various example embodiments and implementations of the subject disclosure.

FIG. 2A is a block diagram representation of one example implementation of a system 200 in which a wearable device 202, which includes a metasurface of unit cells 204, communicates with a computer peripheral (device) 206 coupled to a computing device 208. In the example of FIG. 2A, the computer peripheral device 206 includes an embedded, integrated or otherwise internal transceiver 210, which in turn includes a transmitter 212 and receiver 214. The transceiver components are coupled to an antenna 216 that transmits signals to the metasurface 204 of the passive wearable device 202, which as described herein, alters a redirected instance of the signal's characteristics reflected to the transceiver's receiver 214. As described herein, the antenna 216 is a leaky wave antenna configured to radiate the transmitted signals in different directions/angles.

Based on the received signal, wearable device-related logic 218 (e.g., a hardware or software program running in the computing device 208) can analyze the reflected signal and take some action based thereon as described herein, such as to wake the operating system program or the like for execution in the computing device, authenticate the user, and so on. It is also feasible for the computer peripheral device 206 to include the wearable device-related logic 218, or the wearable device-related logic 218 can be divided between the computer peripheral device 206 and the computing device 208.

Figure 2B:
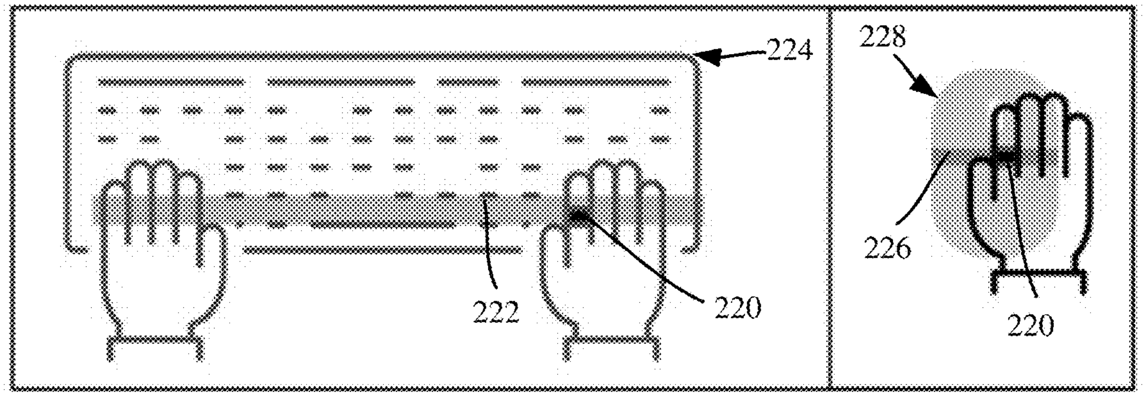
FIG. 2B is a representation of example computer peripheral devices (keyboard and/or mouse that includes a transceiver for communicating with a metasurface, in accordance with various example embodiments and implementations of the subject disclosure.

FIG. 2B shows the general concept of a wearable ring 220 with a metasurface interacting with a peripheral device 224 or 228. The ring-based wearable metasurface 220 can act as a key to lock and unlock a computer, for example, or at least detect the user's presence to wake the computer, such as to automatically open present an interactive lock screen when proximity is detected. More particularly, FIG. 2B shows the concept of an example ring 220 with a metasurface that couples to a transceiver/leaky wave antenna 222 incorporated into a keyboard 224. Alternatively, or in addition to the transceiver/leaky wave antenna 222 incorporated into the keyboard 224, a transceiver/antenna 226 can be incorporated into a mouse 228 or other pointing device. Significantly, because the transceiver in the keyboard 224 or the mouse 228 is below the ring 220 in the normal usage position, the transceiver/leaky wave antenna 222 is configured to radiate the transmitted signal in the upward direction.

In general, for a wearable device, the metasurface is fabricated on flexible material (substrate and metallic ground plane) to facilitate forming the wearable device into a ring shape (FIG. 2B) suitable for wearing on a human finger. For example, each unit cell for an 80 GHz signal measures around 1.88 mm×1.88 mm; such unit cells can be arranged in a matrix to fit within a ring that measures 1.5 cm in width and 2 to 3 cm in length when flattened. The design is conformal, allowing for adjustments to accommodate bending of the surface, ensuring both flexibility and functionality in wearable applications. Moreover, the unit cells can be arranged such that each metasurface has its own distinct reflected radiation pattern, which can be used to identify that metasurface.

Figure 3A:
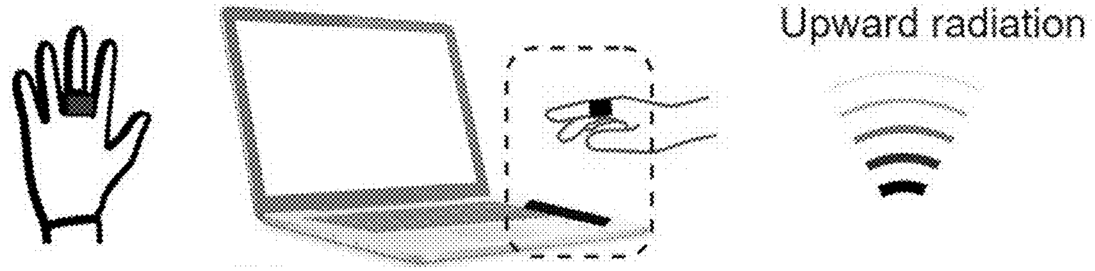
FIGS. 3A-3C are representations of example transceivers with beam-scanning capability depicting signal transmission at different radiation directions, in accordance with various example embodiments and implementations of the subject disclosure.
Figure 3B:
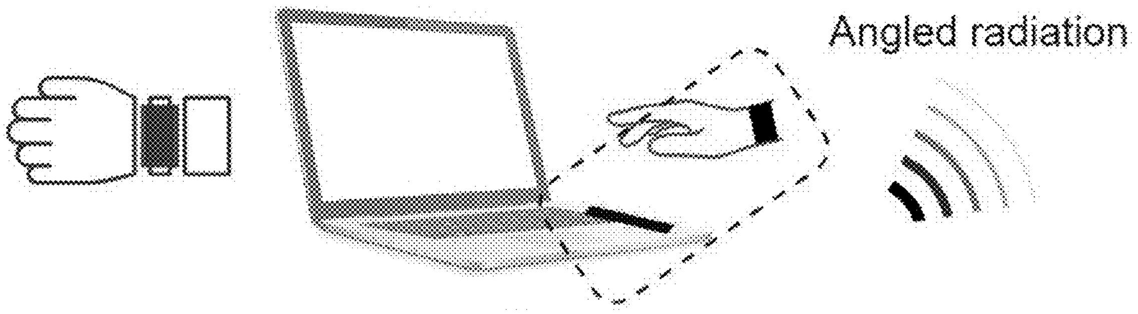
Figure 3C:
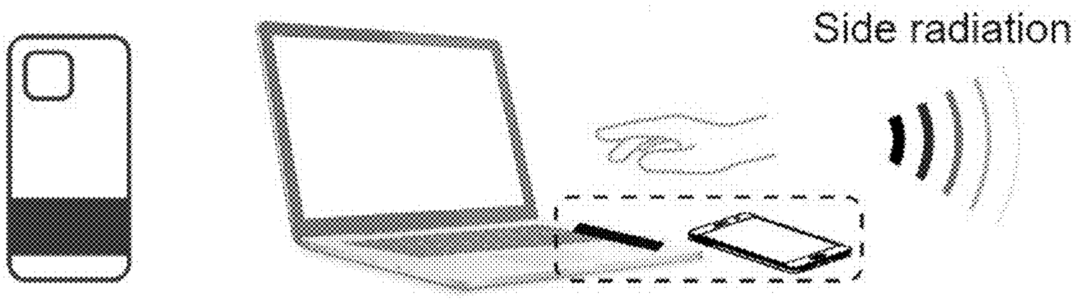

FIGS. 3A-3C show the concept of transmitting the signals in different directions, e.g., depending on a type of wearable or portable device in ordinary usage. More particularly, across different metasurface devices and usage scenarios, better results can be achieved with an appropriate angle of radiation of the transceiver's transmitted signal to seamlessly detect the wearable device. In general, the direction of the radiation can be steered to help capture the signal from the wearable/portable device as the wearable/portable device is typically positioned.

For a metasurface in a ring, as shown in FIG. 3A, upward radiation of the signal is desired, from or near a keyboard/mouse, e.g., the horizontal part of a laptop, or notebook, or a tablet laid flat. For a metasurface in a wristband/bracelet, upwardly angled radiation is desirable, as shown in FIG. 3B; (note however that the antenna may be parallel to the keyboard space bar rather than parallel to the side of the computing device). For a metasurface attached to a cell phone/cell phone case, side-directed radiation is typically desirable, as shown in FIG. 3C.

Although radiation to all directions is a desirable goal, an omni-directional transceiver is practically challenging to implement. Instead, a transceiver with beam-scanning capability is described herein. In one implementation, to mitigate the null regions and to create a seamless experience for the users, described is a leaky wave based antenna design using surface integrated waveguide (SIW) technology.

Figure 4:
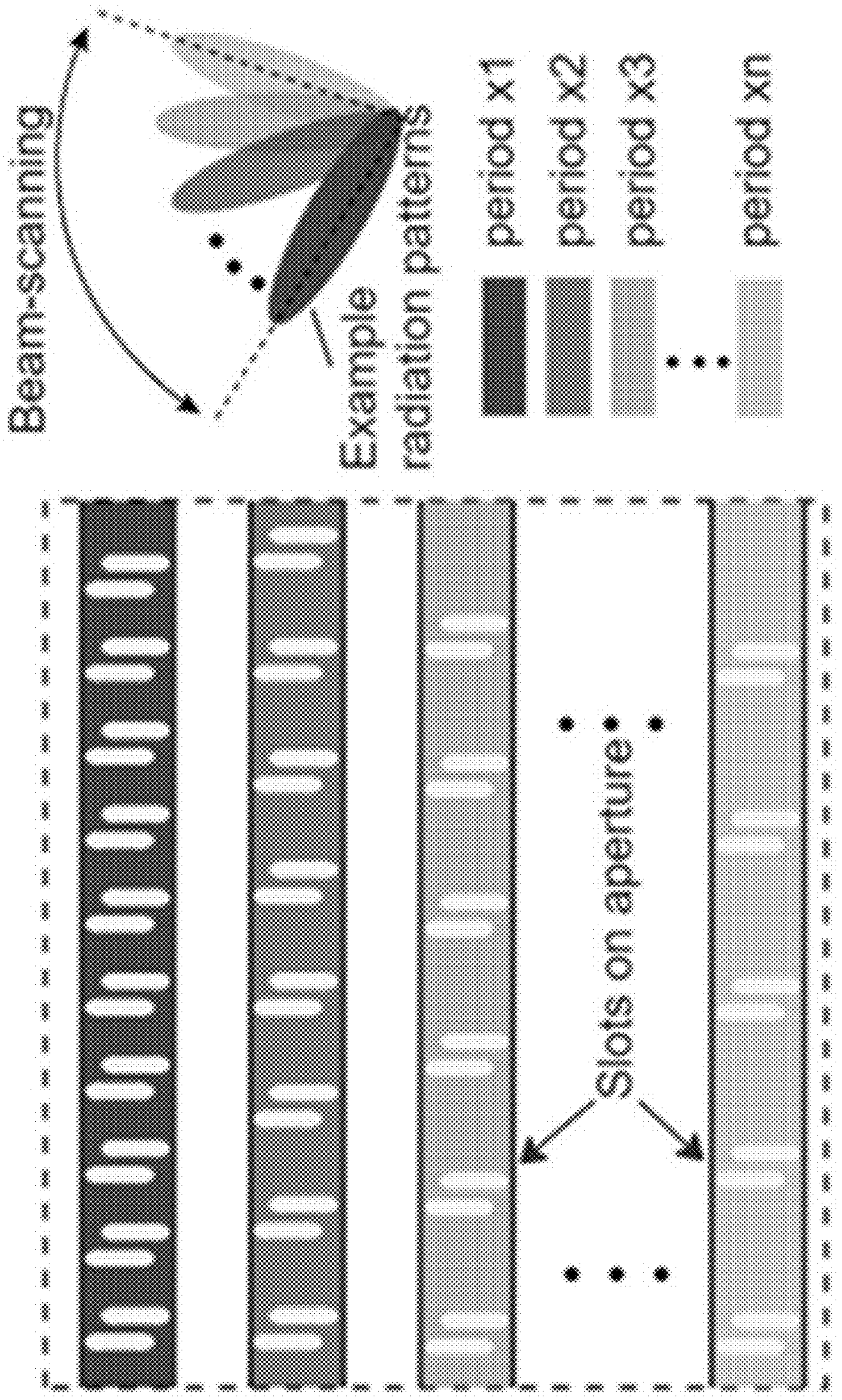
FIG. 4 is a representation of example radiation patterns based on leaky wave antenna beam-scanning with different reflection cancelling slot pairs, in which the different radiation patterns result from different periodicity/spacing of the slot pairs, in accordance with various example embodiments and implementations of the subject disclosure.

FIG. 4 shows the operating principle of a leaky wave antenna based on slots. To achieve beam steering, the periodicity of the antennas is varied; in other words, the slots are arranged in groups, and the slots of each group are spaced apart differently from other slot pair groups in different sections of the antenna, resulting in different radiation patterns. Leaky-wave antennas exploit the leakage of electromagnetic waves to achieve beam scanning or beam shaping capabilities. The characteristic used in the design described herein is beam-scanning controlled by the periodicity of the antennas as shown in FIG. 4, following the scanning law of a leaky-wave antenna:

$$\theta(\omega)=\sin^{-1}\{(\beta(\omega)-2\pi/\Lambda)/k_0\}$$

where $\beta(\omega)$ is the propagation constant, $k_0$ is the free-space wavenumber and $\Lambda$ is the unit-cell period. As will be understood, using substrate integrated waveguide technology, this facilitates a compact, planar transceiver with a leaky wave antenna.

Further, the use of asymmetrical slot pairs results in reflection cancellation. As shown in FIG. 4, reflection-canceling slot pairs is incorporated to achieve broadside radiation while avoiding band-stop effects. Note that the distances between the asymmetrical slot pairs do not change among the differently-spaced groups of slot pairs.

Figure 5A:
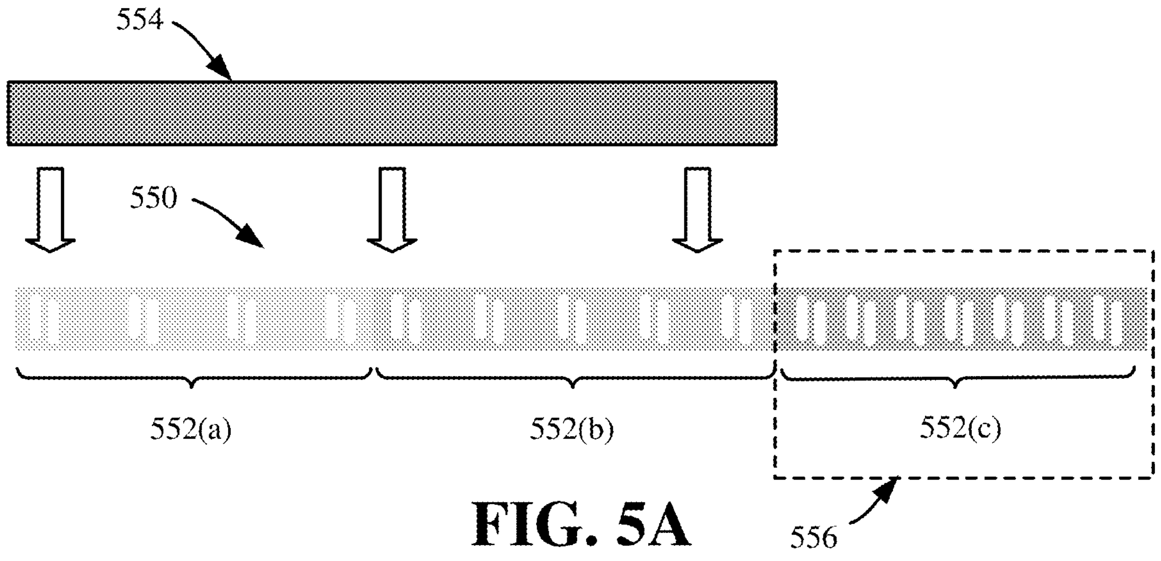
FIG. 5A is a top view representation of a leaky wave antenna based on substrate integrated waveguide technology with reconfiguration facilitated by covering some sections of the slot pairs to provide an active antenna aperture, in accordance with various example embodiments and implementations of the subject disclosure.

Turning to the concept of leaky wave antenna based on substrate integrated waveguide technology, FIGS. 5A (top view) and 5B (three-dimensional perspective view) shows one such design 550. In general, substrate integrated waveguides are a form of transmission line used in microwave and millimeter-wave circuits. They effectively bridge the gap between conventional rectangular waveguides and planar circuits. Substrate integrated waveguides offer several advantages over the conventional waveguides, including that they enable waveguide structures to be incorporated into standard planar circuit technologies, making them suitable for compact and integrated circuit designs. By integrating the waveguide into the substrate, substrate integrated waveguides structures can be fabricated using conventional printed circuit board (PCB) or semiconductor manufacturing techniques. Additionally, they can operate over a wide frequency range, including at high frequencies such as millimeter wave frequencies, making them suitable for various applications.

A substrate integrated waveguide is bounded by upper and lower parallel metal plates, with the sides of the plates typically perforated with an array of metal-filled via holes, which facilitate the inclusion of metal side vias that act as sidewalls of the waveguide, confining the electromagnetic waves between them. Any opening in the upper plate allows radiation to escape, which in this design are the slot pairs.

A substrate integrated waveguide is essentially a waveguide that is integrated into a dielectric substrate. A substrate integrated waveguide thus facilitates a cost-efficient, compact design for beam scanning via a transceiver with a leaky wave antenna as described herein.

Turning to selective steering, to selectively steer the beam in one direction, the apertures formed by the respective groups of slot pairs 552(*a*)-552(*c*) with different respective slot pair periodicities can be arranged in different sections on the top plate, with the slot pair groups corresponding to non-desired directions covered with a metal cover 554. In this way, only the uncovered slot pairs (the slot pairs 552(*c*) in this example) act as an active antenna 556. In other words, when an RF shielding cover is applied, the exposed antennas emit radiation, while those covered behave like conventional substrate integrated waveguide (SIW) structures, ceasing to radiate.

Figure 5B:
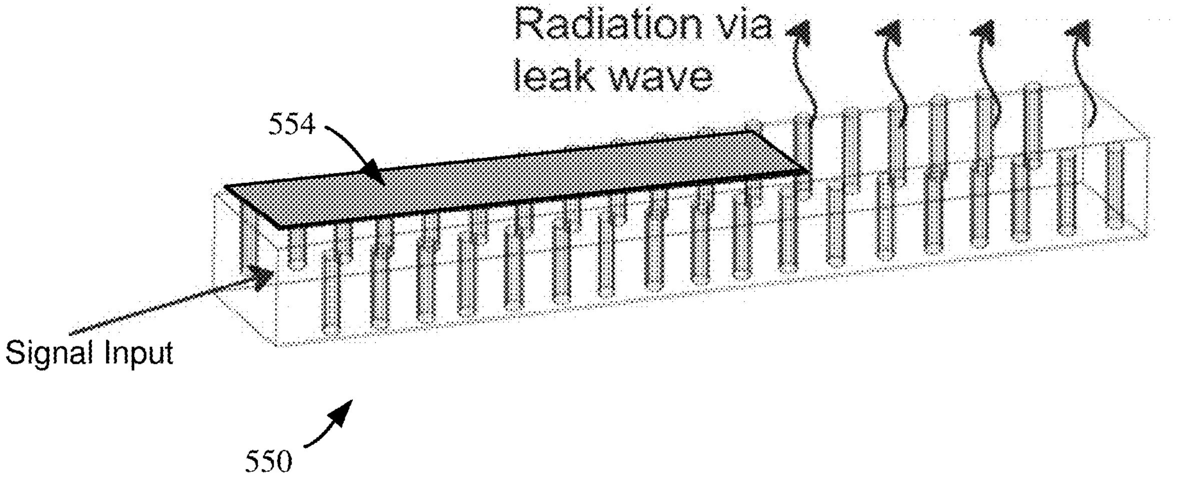
FIG. 5B is a three-dimensional perspective view representation of the leaky wave antenna with covered sections corresponding to FIG. 5A, in accordance with various example embodiments and implementations of the subject disclosure.
Figure 6A:
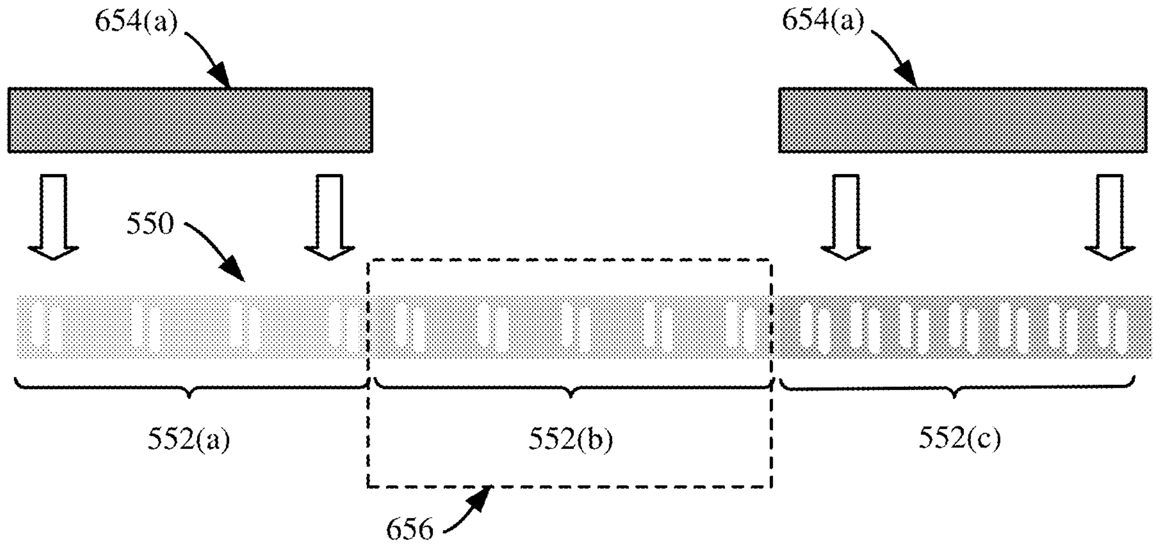
FIG. 6A is a top view representation of a leaky wave antenna based on substrate integrated waveguide technology with reconfiguration facilitated by covering two separate sections of the slot pairs to provide an active antenna aperture, in accordance with various example embodiments and implementations of the subject disclosure.
Figure 6B:
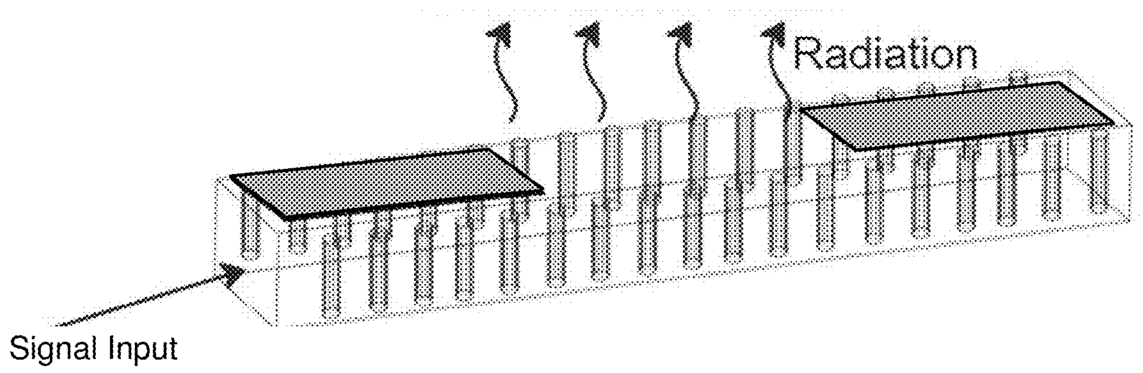
FIG. 6B is a three-dimensional perspective view representation of the leaky wave antenna with separate covered sections corresponding to FIG. 6A, in accordance with various example embodiments and implementations of the subject disclosure.

FIGS. 6A and 6B show a similar concept, except that two covers 654(*a*) and 654(*b*) are used so that the center group of slot pairs 552(*b*) becomes the active antenna 656. As described with reference to FIG. 4, this active antenna 656/slot pair group 552(*b*) of FIGS. 6A and 6B has a different radiation direction from the active antenna 556/slot pair group 552(*c*) of FIGS. 5A and 5B. As can be appreciated, more than one antenna/slot pair section can be active at a time, e.g., the slot pair group 552(*a*) and 552(*c*) can be active antenna sections, although some way to mitigate potential interference may be needed.

To summarize, the beam-steering capability of the transceiver, e.g., for proximity detection, relies on a design featuring leaky-wave antennas. If a selected beam steering direction is desired, an antenna section can be left uncovered to emit radiation, while other section(s) can be covered, thereby not radiating and acting as a conventional substrate integrated waveguide, that is, the sections under cover behave like conventional substrate integrated waveguide and the exposed section(s) behave like conventional leaky wave antennas. A straightforward design is to arrange the leaky wave antennas in a linear configuration of slot pair sections, each with varying periodicities, although other designs can be used with more complex covering solutions.

Figure 7:
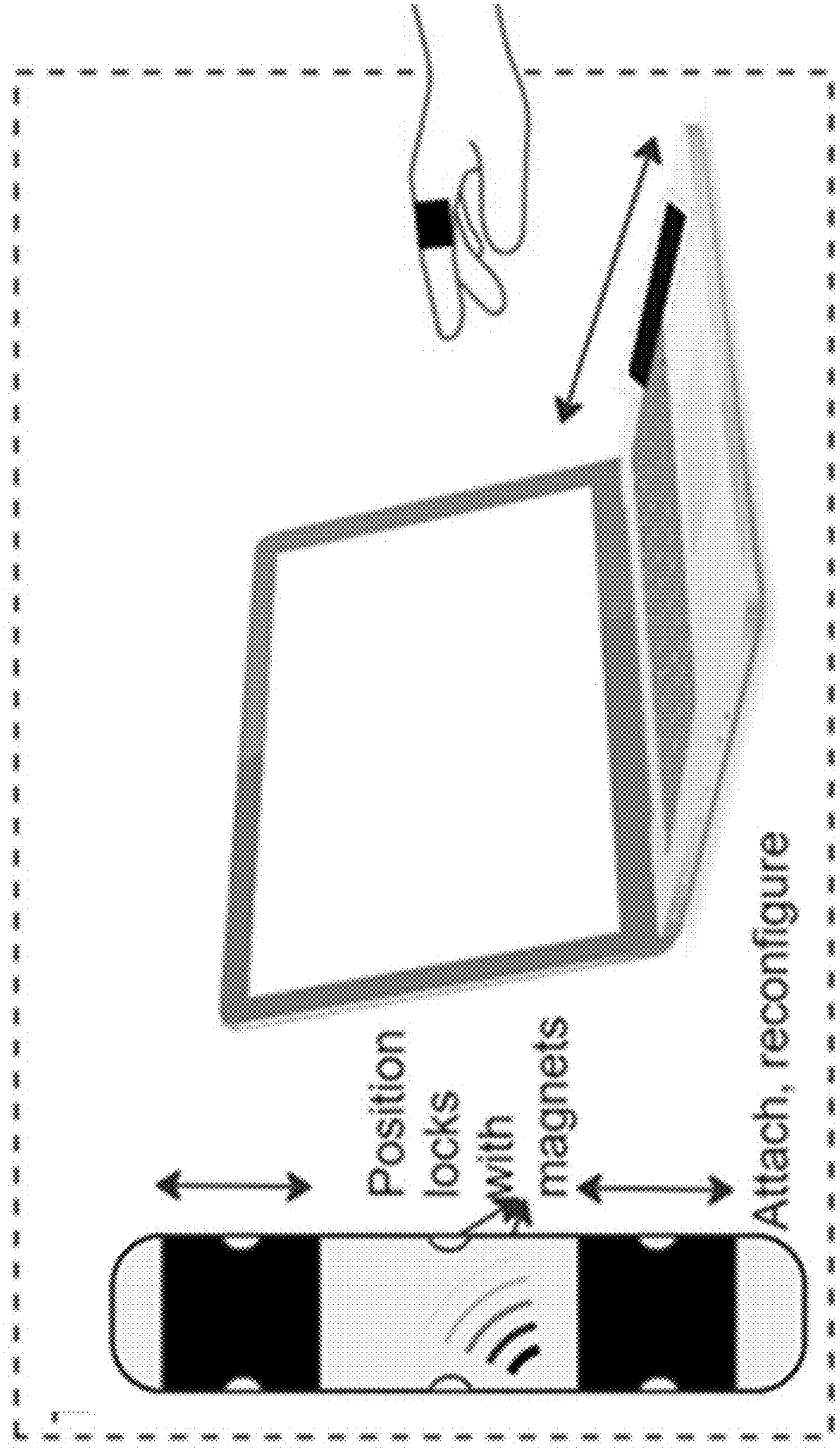
FIG. 7 is a representation of a leaky wave antenna array in which metal covers include small magnets to align to a predefined position on the leaky wave antenna array, in accordance with various example embodiments and implementations of the subject disclosure.

FIG. 7 shows a reconfigurable way to implement the aperture reconfiguration for a given leaky wave antenna array implementation scenario. In the example of FIG. 7, the reconfiguration is enabled by magnetic attraction; the metal covers feature small magnets to align to predefined position on the leaky wave antenna array.

More particularly, magnets (and/or some mechanical coupler) facilitate correct cover alignment so that one or more of the desired antenna sections/slot pair groups are covered, with only the correct section fully exposed to transmit as much signal as available. Consider a scenario where a user wishes to switch the device mode or direction of the transceiver. In such cases, the user can expose the desired antenna by aligning it with the corresponding marking printed on the mask. Alternatively, or in addition to aligning via marking, the provided metal covers can be snapped onto the other position locks using magnets. It should be noted that a manufacturer or the like can also use the covering technology described herein, e.g., a generic antenna can be sold, and during design/calibration, the desired radiation angle can be chosen without needing a custom antenna for each different design/product. Note that while feasible, other reconfiguration methods for shielding, such as electrical switching and mechanical motors, prove impractical with respect to cost-effective and space-efficient applications.

Figure 8:
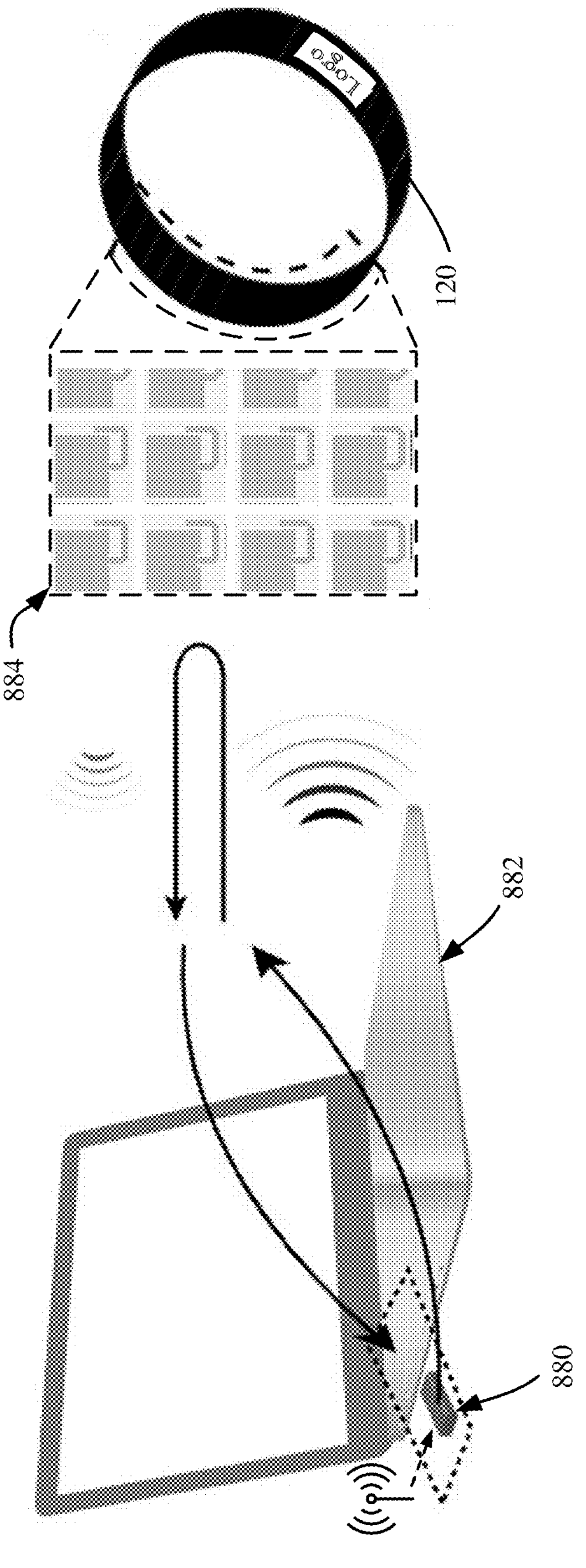
FIG. 8 is a representation of an example wearable device in the form of a ring design, highlighting a passive metasurface communicating with a leaky wave antenna-based transceiver embedded in a computer peripheral configured to couple to a computing device port, in accordance with various example embodiments and implementations of the subject disclosure.

Turning to other considerations, the transceiver with the leaky wave antenna as described herein can also be integrated into a separate peripheral device for coupling to a computer port. For example, as shown in FIG. 8, an external transceiver 880 can be designed as a universal serial bus (USB) device or other suitable device that plugs into a port of a computing device 882. In the example of FIG. 8, a portion of the metasurface unit cells 884 is shown enlarged and interacting with the transceiver 880 when inserted into the port of the computer 882 and powered up. In general, the user only needs to orient his or her hand at a reasonably close and suitable reflecting angle for the system to operate, and the radiation direction of the transceiver can be selected based on the likely location of the port.

Figure 9:
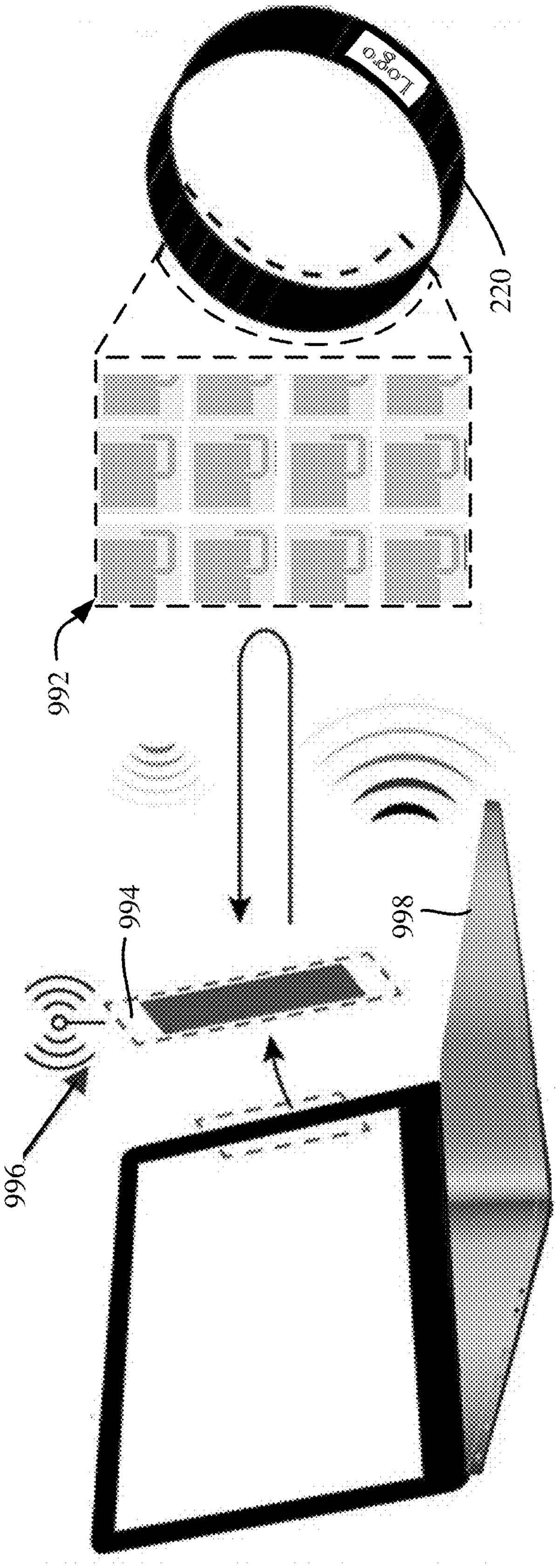
FIG. 9 is a representation of an example wearable device in the form of a ring design, highlighting the passive metasurface communicating with a leaky wave antenna-based transceiver embedded in a computing device bezel, in accordance with various example embodiments and implementations of the subject disclosure.

In the example of FIG. 9, a portion of the metasurface unit cells 992 is shown enlarged and interacting with a transceiver 994 (via leaky wave antenna 996) integrated into the bezel or the like of the computer 998. In general, the user only needs to orient his or her hand at a reasonably close and suitable reflecting angle for the system to operate. Instead of (or in addition to) the bezel location, the transceiver 994 (or the antenna 996 coupled thereto) can be embedded into the lower portion of the laptop so that when interacting with the keyboard/mouse pad, the user's ring is naturally angled downward in a direction generally towards the antenna.

Figure 10:
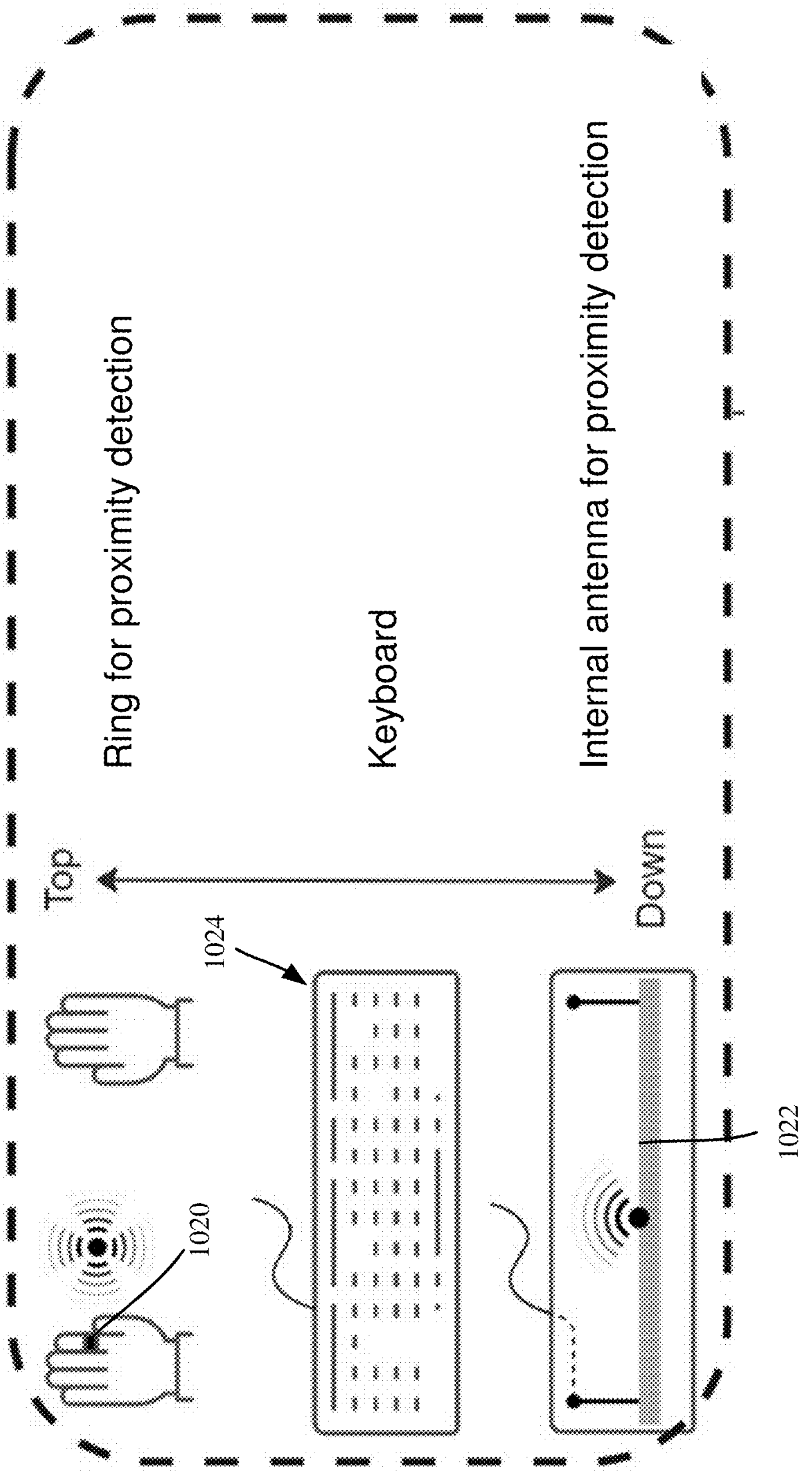
FIG. 10 is a representation of an example wearable device above a keyboard with an embedded leaky wave antenna-based transceiver, in accordance with various example embodiments and implementations of the subject disclosure.

FIG. 10 shows a top-downwards description of a ring 1020 on a user's hand above a keyboard 1024 as is typically the position when typing thereon. In this hand position, the transceiver/leaky wave antenna 1022 is configured to radiate signals at an acceptable (upward) angle for sending signals to and receiving reflected signals from the ring 1020. The mouse (not shown in FIG. 10) can similarly have its leaky wave antenna configured to couple with the ring/metasurface above the mouse as is typical during mouse interactions. Note that with a laptop computer, the leaky wave antenna can be in a similar position with respect to the laptop's integrated keyboard and touchpad or the like. When interacting with the keyboard/mouse pad, the user's ring is naturally oriented in a direction generally above the antenna at a good angle for coupling.

Figure 11A:
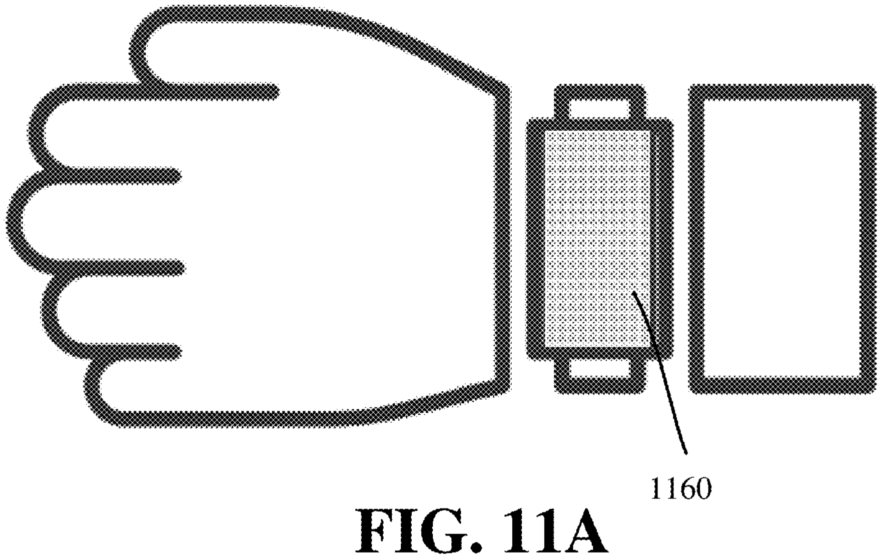
FIG. 11A is a representation of an example wearable device with a passive metasurface in the form of a wrist-wearable (e.g., wristband or bracelet) design, in accordance with various example embodiments and implementations of the subject disclosure.
Figure 11B:
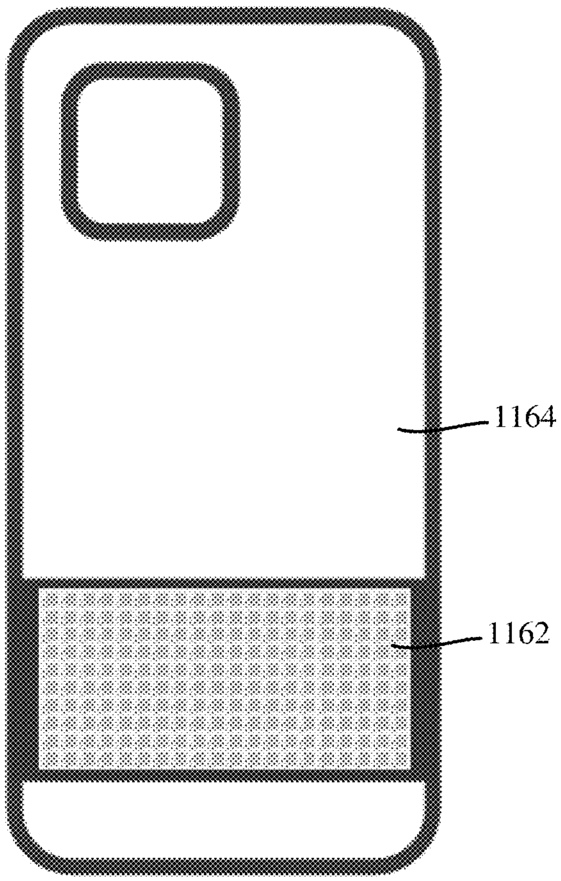
FIG. 11B is a representation of an example passive portable device with a passive metasurface in the form of a design for affixing to a personal item (e.g., cell phone), in accordance with various example embodiments and implementations of the subject disclosure.

FIGS. 11A and 11B show alternative, non-limiting examples of wearable devices, namely a wrist-worn (e.g., wristband or bracelet) device 1160, and a portable device 1162 attached to a cell phone case 1164. Although the portable device 1162 attached to the cell phone case 1164 is not "wearable" in the conventional sense, it can be considered "wearable" to the extent it accompanies a user and is typically part of the user's personal accoutrements that are generally within the user's possession, and indeed, can be "worn" in a user's pocket.

Figure 12A:
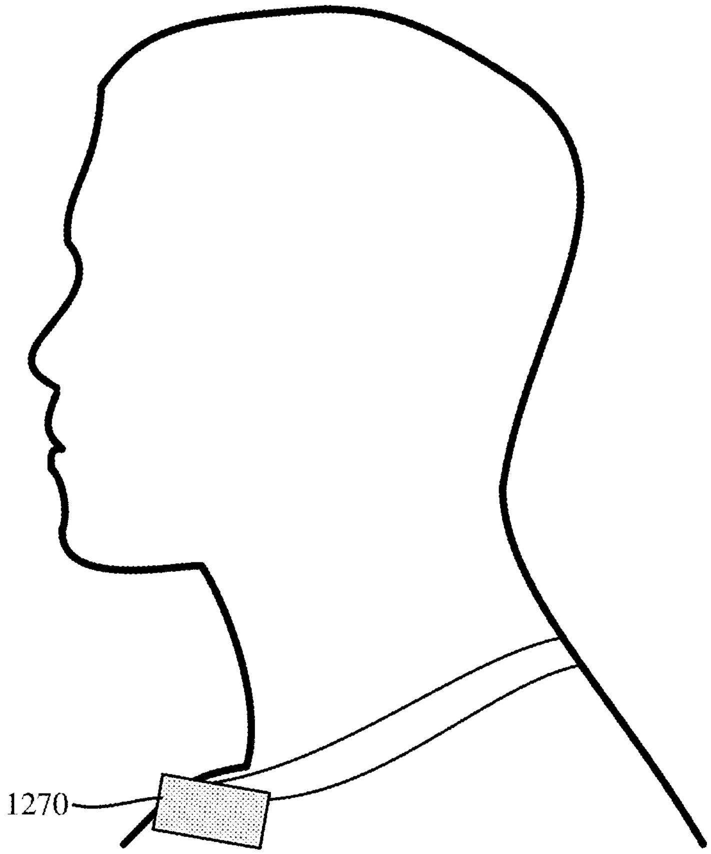
FIG. 12A is a representation of an example wearable device with a passive metasurface in the form of a neck-wearable (e.g., via a lanyard or necklace) design, in accordance with various example embodiments and implementations of the subject disclosure.
Figure 12B:
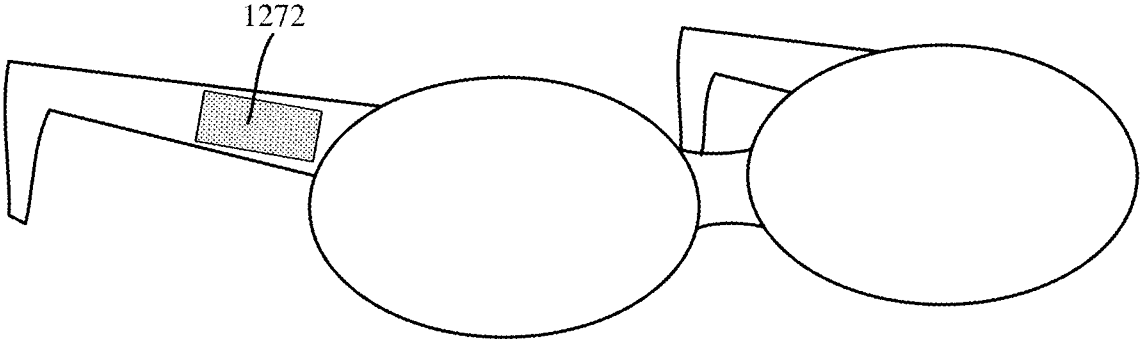
FIG. 12B is a representation of an example portable wearable device with a passive metasurface in the form of a design for affixing to a wearable item (e.g., eyeglass frames), in accordance with various example embodiments and implementations of the subject disclosure.

FIGS. 12A and 12B show metasurfaces worn around a user's neck (e.g., as a necklace, locket or in lanyard) wearable device 1270, and a wearable device 1272 affixed to a user's eyeglass frame, respectively. A leaky wave antenna can be configured to emit the radiated signal in the appropriate direction for such types of devices. Other non-limiting examples that are not explicitly shown include an identification badge, a name tag patch (e.g., affixed at a conference), a headset or headphones (e.g., regularly worn while working with a computer), and so on. Note that while the metasurface itself is passive, the metasurface can be coupled to a non-passive device, e.g., a watchband of a user's existing battery-powered wristwatch. Some example consideration factors when choosing among the wearable metasurface devices are summarized in the following table:

| User Needs | Product |
|---|---|
| Tranceiver Alignment | Ring |
| Gain | Wrist-worn Device |
| Convenience | Affixed/Embedded to Phone Case |

One or more example implementations and embodiments can be embodied in a device, such as described and represented herein. The device can include a radio frequency signal source, and a planar transmitter coupled to radio frequency signal source, the planar transmitter comprising a leaky wave antenna structure configured for beam scanning, wherein the leaky wave antenna structure can include respective apertures formed by respective groups of slot pairs, and wherein the respective groups of slot pairs have respective different spacing periodicity patterns resulting in respective different beam scanning radiation pattern angles transmitted via the leaky wave antenna structure.

The respective different spacing periodicity patterns can be configured to result in the different beam scanning radiation pattern angles that mitigate an effect of null regions between the different beam scanning radiation pattern angles.

The planar transmitter can be incorporated with a receiver into a transceiver.

The leaky wave antenna structure can include a substrate integrated waveguide structure.

At least some of the respective groups of slot pairs can facilitate reflection cancellation. At least some of the respective groups of slot pairs can facilitate the reflection cancellation via at least some respective groups of asymmetrical slot pairs.

The respective groups of slot pairs can facilitate reflection cancellation to avoid stop band effects and facilitate broadside radiation.

The device can be incorporated into a computing device for transmission of radio frequency signals to a metasurface for redirection to a receiver via at least one of the different beam scanning radiation pattern angles. The metasurface can be incorporated into a wearable device having a variable orientation relative to the planar transmitter.

The device can be incorporated into a computer peripheral device for transmission of radio frequency signals to a metasurface via at least one of the different beam scanning radiation pattern angles.

The metasurface can be incorporated into a wearable device having a variable orientation relative to the planar transmitter.

One or more example implementations and embodiments can be embodied in a transceiver, such as described and represented herein. The transceiver can include a receiver, and a planar transmitter coupled to a radio frequency signal (RF) signal source, the planar transmitter comprising a leaky wave antenna structure configured for beam scanning transmitted RF signals at different beam scanning angles, based on respective groups of slot pairs comprising respective different spacing periodicity patterns, to a metasurface for reflection of at least one of the transmitted RF signals to the receiver as at least one reflected instance of the at least one of the transmitted RF signals.

The respective different spacing periodicity patterns can be configured to result in the different beam scanning angles that reduce null regions between the different beam scanning angles.

The leaky wave antenna structure can include a substrate integrated waveguide structure.

At least some of the respective groups of slot pairs can include asymmetrical slot pairs to facilitate reflection cancellation. At least some of the respective groups of slot pairs can include asymmetrical slot pairs to facilitate reflection cancellation that avoids stop band effects and facilitates broadside radiation.

One or more example implementations and embodiments can be embodied in a system, such as described and represented herein. The system can include a planar wireless radio frequency (RF) transmitter, a wireless RF receiver, and a metasurface that can include respective passive unit cells that redirect transmitted wireless RF signals, transmitted by the planar wireless RF transmitter and impinging on at least part of the metasurface, as reflected wireless RF signals for reception by the RF receiver. The wireless RF transmitter can include a leaky wave antenna structure configured for beam scanning the transmitted RF signals at different beam scanning angles, based on respective groups of slot pairs comprising respective different spacing periodicity patterns, to the metasurface for reflection to the receiver for use in detection of the metasurface by a computing device coupled to the wireless RF receiver.

The leaky wave antenna structure can include a substrate integrated waveguide structure.

The slot pairs of the respective groups of slot pairs can include asymmetrical slot pairs to facilitate reflection cancellation.

The metasurface alters the transmitted signal for reflection to the receiver with a distinct radiation pattern that distinctly identifies the metasurface.

As can be seen, the technology described herein is directed to a transceiver based on leaky wave antenna technology, with beam scanning resulting from different spacing between slot pairs among slot pair groups. The transceiver can RF couple to a metasurface by transmitting signals from the leaky wave antenna in desired directions, to facilitate seamless interaction with digital environments.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A device, comprising:

a radio frequency signal source; and a planar transmitter coupled to the radio frequency signal source, the planar transmitter comprising a leaky wave antenna structure configured for beam scanning, wherein the leaky wave antenna structure comprises respective apertures formed by respective groups of slot pairs, wherein the respective groups of slot pairs have respective different spacing periodicity patterns resulting in respective different beam scanning radiation pattern angles transmitted via the leaky wave antenna structure, wherein the device is incorporated into a computing device for transmission of radio frequency signals to units cells of a metasurface for redirection to a receiver via at least one of the different beam scanning radiation pattern angles, and wherein the unit cells are arranged to result in the metasurface having a distinct reflected radiation pattern, the distinct reflected radiation pattern being usable to identify the metasurface.

2. The device of claim 1, wherein the respective different spacing periodicity patterns are configured to result in the different beam scanning radiation pattern angles that mitigate an effect of null regions between the different beam scanning radiation pattern angles.

3. The device of claim 1, wherein the planar transmitter is incorporated with another receiver into a transceiver.

4. The device of claim 1, wherein the leaky wave antenna structure comprises a substrate integrated waveguide structure.

5. The device of claim 1, wherein at least one of the respective groups of slot pairs facilitate reflection cancellation.

6. The device of claim 5, wherein the at least one of the respective groups of slot pairs is at least one asymmetrical slot pair.

7. The device of claim 1, wherein the respective groups of slot pairs facilitate reflection cancellation to avoid stop band effects and facilitate broadside radiation.

8. The device of claim 1, wherein the metasurface is incorporated into a wearable device having a variable orientation relative to the planar transmitter.

9. The device of claim 8, wherein the wearable device is an eyeglass frame.

10. The device of claim 8, wherein the wearable device is wrist-wearable.

11. The device of claim 8, wherein the wearable device is a ring.

12. The device of claim 8, wherein the wearable device is neck-wearable.

13. A device, comprising:

a radio frequency signal source; and a planar transmitter coupled to the radio frequency signal source, the planar transmitter comprising a leaky wave antenna structure configured for beam scanning, wherein the leaky wave antenna structure comprises respective apertures formed by respective groups of slot pairs, wherein the respective groups of slot pairs have respective different spacing periodicity patterns resulting in respective different beam scanning radiation pattern angles transmitted via the leaky wave antenna structure, wherein the device is incorporated into a computer peripheral device for transmission of radio frequency signals to units cells of a metasurface via at least one of the different beam scanning radiation pattern angles, wherein the unit cells have been arranged according to an arrangement that results in a distinct reflected radiation pattern for the metasurface, and wherein the distinct reflected radiation pattern corresponds to a unique identifier of the metasurface.

14. The device of claim 13, wherein the respective different spacing periodicity patterns are configured to result in the different beam scanning radiation pattern angles that mitigate an effect of null regions between the different beam scanning radiation pattern angles.

15. The device of claim 13, wherein the planar transmitter is incorporated with another receiver into a transceiver.

16. The device of claim 13, wherein the leaky wave antenna structure comprises a substrate integrated waveguide structure.

17. The device of claim 13, wherein at least one of the respective groups of slot pairs facilitate reflection cancellation, and wherein the at least one of the respective groups of slot pairs facilitate is at least one asymmetrical slot pair.

18. A device, comprising:

a radio frequency signal source; and a planar transmitter coupled to the radio frequency signal source, the planar transmitter comprising a leaky wave antenna structure configured for beam scanning, wherein the leaky wave antenna structure comprises respective apertures formed by respective groups of slot pairs, wherein the respective groups of slot pairs have respective different spacing periodicity patterns resulting in respective different beam scanning radiation pattern angles transmitted via the leaky wave antenna structure, wherein the device is incorporated into a computer peripheral device for transmission of radio frequency signals to units cells of a metasurface via at least one of the different beam scanning radiation pattern angles, and wherein the unit cells are arranged such that the metasurface has its own distinct reflected radiation pattern, which is able to be used to identify that metasurface.

19. The device of claim 18, wherein the respective groups of slot pairs facilitate reflection cancellation to avoid stop band effects and facilitate broadside radiation.

20. The device of claim 18, wherein the metasurface is incorporated into a wearable device having a variable orientation relative to the planar transmitter.

* * * * *